US012427800B2

(12) United States Patent
Nejad et al.

(10) Patent No.: US 12,427,800 B2
(45) **Date of Patent: *Sep. 30, 2025**

(54) POP-UP GIFT CARD WITH REMOVABLE POP-UP DISPLAY STRUCTURE

(71) Applicant: LovePop, Inc., Boston, MA (US)

(72) Inventors: Dariush Nejad, Somerville, MA (US); Jozef Karpiel, Cambridge, MA (US); Robin S. Rose, Cambridge, MA (US); Emilio Latorre Armendariz, Arlington, MA (US); John P. Wise, Cambridge, MA (US)

(73) Assignee: LovePop, Inc., Boston, MA (US)

( * ) Notice: Subject to any disclaimer, the term of this patent is extended or adjusted under 35 U.S.C. 154(b) by 160 days.

This patent is subject to a terminal disclaimer.

(21) Appl. No.: 17/375,144

(22) Filed: Jul. 14, 2021

(65) Prior Publication Data

US 2021/0339551 A1 Nov. 4, 2021

Related U.S. Application Data

(63) Continuation of application No. 16/561,294, filed on Sep. 5, 2019, now Pat. No. 11,084,313.

(60) Provisional application No. 62/727,351, filed on Sep. 5, 2018.

(51) Int. Cl.

| | |
|---|---|
| ***B42D 15/04*** | (2006.01) |
| ***G09F 1/06*** | (2006.01) |
| ***G09F 1/08*** | (2006.01) |

(52) U.S. Cl.
CPC ............ *B42D 15/042* (2013.01); *G09F 1/06* (2013.01); *G09F 1/065* (2013.01); *G09F 1/08* (2013.01)

(58) Field of Classification Search
CPC ... G09F 1/08; G09F 1/065; G09F 1/06; B42D 15/042; A63H 33/38
See application file for complete search history.

(56) References Cited

U.S. PATENT DOCUMENTS

| | | | | | |
|---|---|---|---|---|---|
| 792,130 | A * | 6/1905 | Heftler | A63H 33/38 40/538 |
| 930,108 | A * | 8/1909 | Walcutt | A63H 33/38 119/431 |
| 2,148,279 | A | 2/1939 | Valentine et al. | |
| 2,427,629 | A * | 9/1947 | Smith | G09F 1/06 40/124.09 |

(Continued)

*Primary Examiner* — David R Dunn
*Assistant Examiner* — Christopher E Veraa
(74) *Attorney, Agent, or Firm* — Polsinelli PC

(57) ABSTRACT

A pop-up gift card includes a card that is foldable along a fold line between closed and opened positions. The card includes a separable perforated section extending over both sides of the fold line. An erectable pop-up display structure comprising a plurality of intersecting slice-form elements is mounted on the perforated section of the card. When the card is closed, the pop-up display structure is in a flattened state, and when the card is opened, the pop-up display structure is in an erected 3-D state. The pop-up display structure can be removed from the card by separating the perforated section from the rest of the card. A support element can be affixed to the perforated section for maintaining the pop-up display structure in the 3-D state when the pop-up display structure is removed from the card.

20 Claims, 7 Drawing Sheets

(56) References Cited

U.S. PATENT DOCUMENTS

| | | | | | |
|---|---|---|---|---|---|
| 4,084,015 | A * | 4/1978 | Patterson | B42D 15/042 | 446/388 |
| 4,234,148 | A | 11/1980 | Maddestra et al. | | |
| 4,349,973 | A * | 9/1982 | Penick | G09F 1/06 | 446/148 |
| 5,758,438 | A * | 6/1998 | Crowell | G09F 1/08 | 283/117 |
| 6,199,308 | B1 * | 3/2001 | Westendorp | B42D 15/042 | 40/539 |
| 7,607,247 | B2 * | 10/2009 | Jenkins | B65D 27/02 | 446/148 |
| 7,883,115 | B2 * | 2/2011 | Keefe | B42D 13/00 | 281/3.1 |
| 8,499,478 | B1 * | 8/2013 | Glass | B42D 25/22 | 40/124.14 |
| 9,542,865 | B2 * | 1/2017 | Simmons | B42D 15/042 | |
| 9,842,516 | B2 * | 12/2017 | Yeh | B44C 5/00 | |
| 10,713,975 | B2 * | 7/2020 | Wallen | G09F 1/06 | |
| 11,577,539 | B1 * | 2/2023 | Chen | G09F 1/06 | |
| 2003/0097773 | A1 | 5/2003 | Oh | | |
| 2005/0132621 | A1 | 6/2005 | Bostick, II | | |
| 2005/0278994 | A1 | 12/2005 | Evans, Jr. | | |
| 2007/0293118 | A1 | 12/2007 | Prescott | | |
| 2010/0018090 | A1 * | 1/2010 | Dickert | B42D 5/027 | 40/124.08 |
| 2010/0325924 | A1 | 12/2010 | Aletto et al. | | |
| 2014/0360065 | A1 | 12/2014 | Barber et al. | | |
| 2015/0332611 | A1 * | 11/2015 | Yeh | B44C 5/06 | 40/124.08 |
| 2016/0365009 | A1 | 12/2016 | Wise et al. | | |
| 2016/0365010 | A1 * | 12/2016 | Wise | G09F 1/08 | |
| 2022/0032204 | A1 * | 2/2022 | Karpiel | G09F 1/08 | |

* cited by examiner

POP-UP GIFT CARD WITH REMOVABLE POP-UP DISPLAY STRUCTURE

CROSS REFERENCE TO RELATED APPLICATIONS

The present application is a continuation of U.S. patent application Ser. No. 16/561,294, entitled "Pop-up Gift Card with Removable Pop-Up Display Structure" and filed on Sep. 5, 2019, which claims priority from U.S. Provisional Patent Application No. 62/727,351, entitled "Pop-up Gift Card with Removable Pop-Up Display Structure" and filed on Sep. 5, 2018. Each of these applications is specifically incorporated by reference in its entirety herein.

BACKGROUND

The present application relates generally to pop-up cards and, more particularly, to a pop-up gift card with a removable pop-up display structure usable as a display item.

BRIEF SUMMARY OF THE DISCLOSURE

A pop-up card in accordance with one or more embodiments includes a card that is foldable along a fold line between closed and opened positions. The card includes a separable perforated section extending over both sides of the fold line. An erectable pop-up display structure comprising a plurality of intersecting slice-form elements is mounted on the perforated section of the card. When the card is closed, the pop-up display structure is in a flattened state, and when the card is opened, the pop-up display structure is in an erected 3-D state. The pop-up display structure can be removed from the card by separating the perforated section from the rest of the card. A support element can be affixed to the perforated section for maintaining the pop-up display structure in the 3-D state when the pop-up display structure is removed from the card.

In accordance with one or more further embodiments, a method is disclosed for assembling a display item from a pop-up card. The pop-up card comprises a card foldable along a fold line between closed and opened positions. The card includes a separable perforated section extending over both sides of the fold line. The pop-up card further includes an erectable pop-up display structure comprising a plurality of intersecting slice-form elements mounted on the perforated section of the card such that when the card is closed, the pop-up display structure is in a flattened state, and when the card is opened, the pop-up display structure is in an erected 3-D state. The method includes the steps of (a) removing the pop-up display structure from the card by separating the perforated section from the rest of the card, and (b) affixing a support element to the perforated section for maintaining the pop-up display structure in the 3-D state.

BRIEF DESCRIPTION OF THE DRAWINGS

Like or identical reference numbers are used to identify common or similar elements.

DETAILED DESCRIPTION

Pop-up cards are greeting cards that include an erectable pop-up display structure that unfolds from a flattened state when the card is closed to an erected 3-D state when the card is opened.

Various embodiments disclosed herein relate to a pop-up gift card with a removable pop-up display structure usable as a display item.

Figure 1:
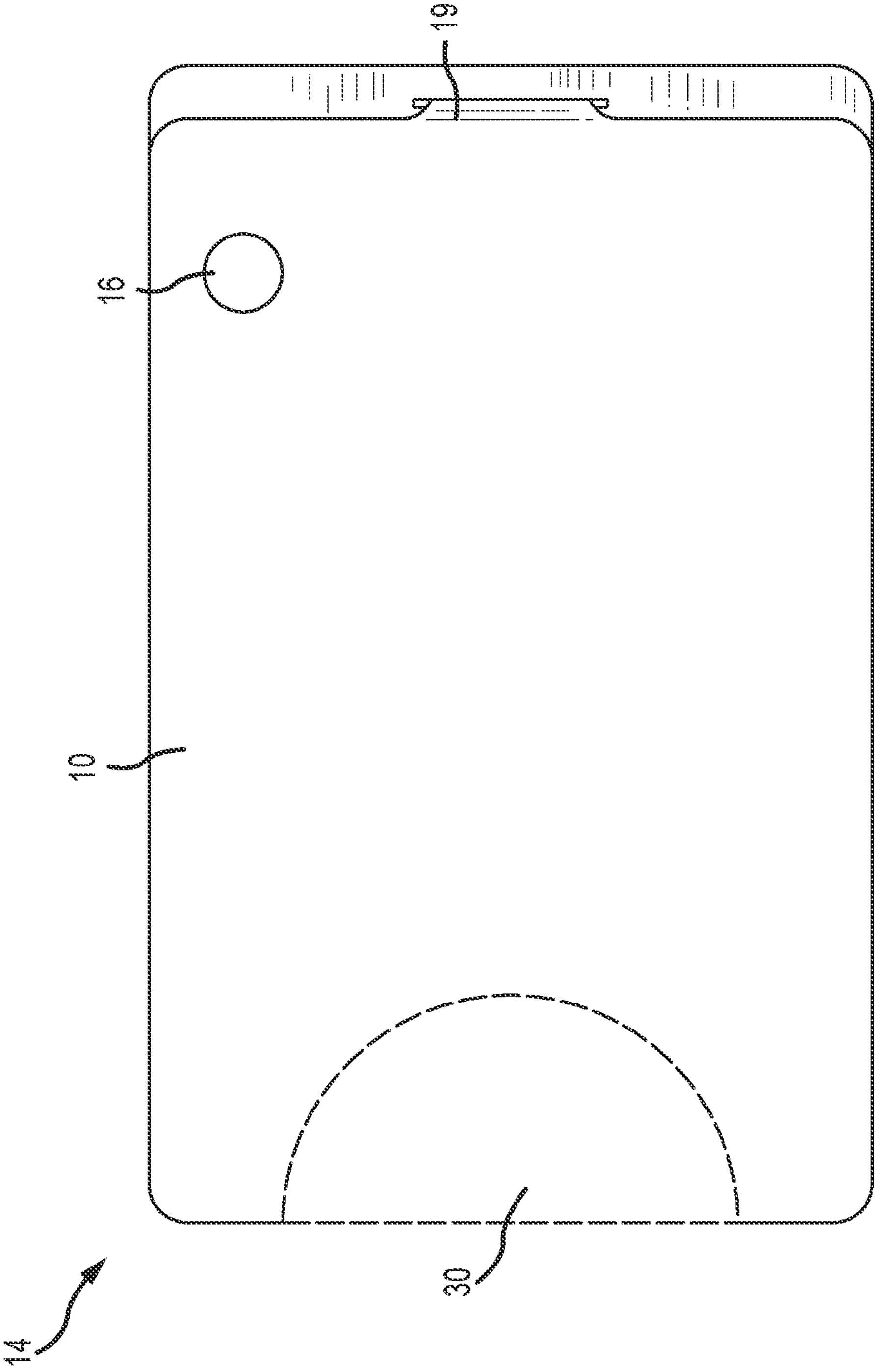
FIGS. 1 and 2 illustrate opposite sides of a pop-up gift card in a folded configuration in accordance with one or more embodiments.
Figure 2:
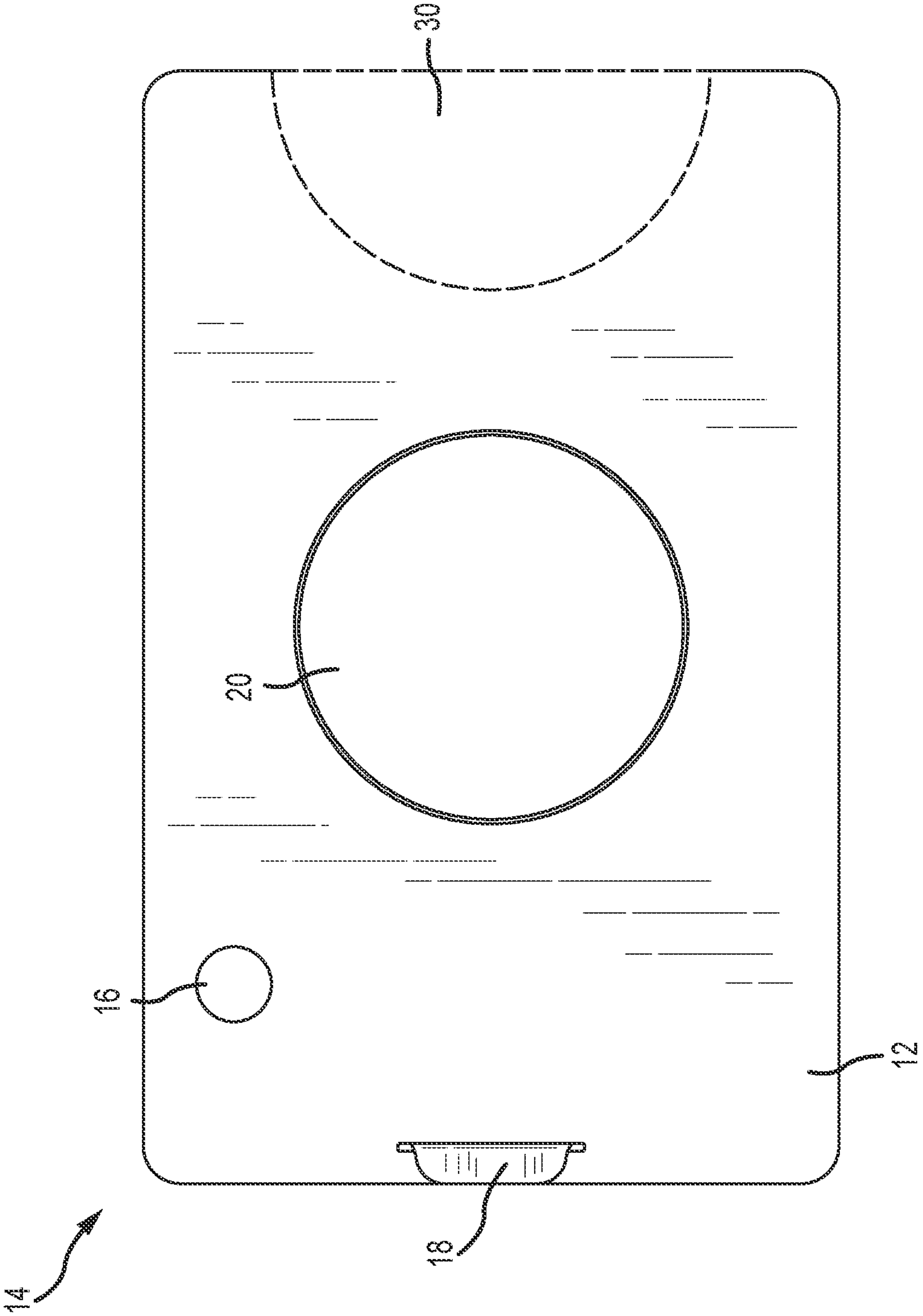

FIGS. 1 and 2 illustrate opposite sides 10, 12 of a pop-up gift card 14 in a folded configuration in accordance with one or more embodiments.

The gift card 14 includes an opening 16 at a corner thereof usable for tying the card 14 to a gift or other item using ribbons, strings, and the like.

The gift card 14 also includes a tab 18 on one side and a corresponding slot 19 on the other for receiving the tab 18 to keep the card 14 closed in the folded configuration.

A support element 20 used for supporting the pop-up display structure when removed is removably attached to one side of the gift card 14.

Figure 3:
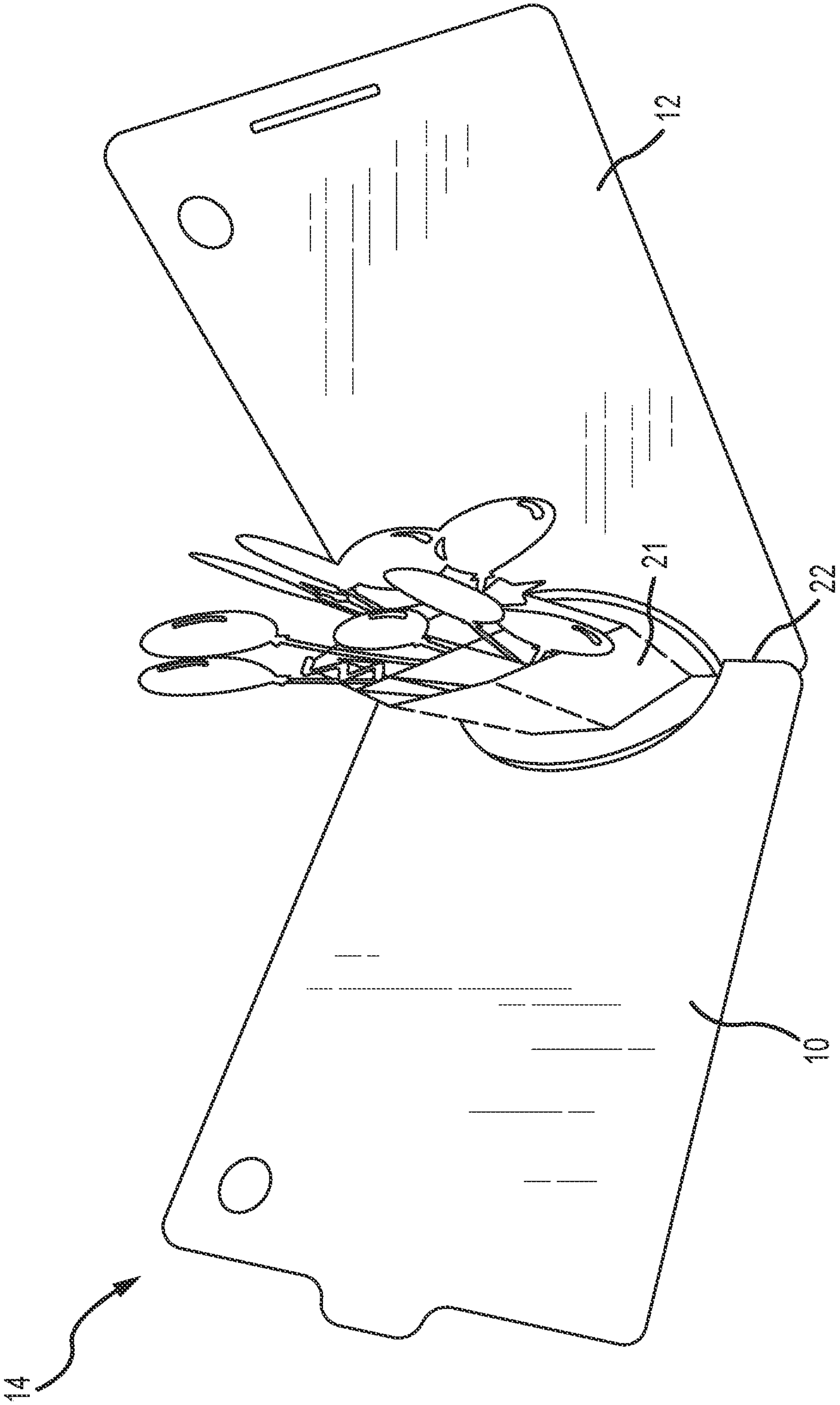
FIGS. 3 and 4 illustrate the pop-up gift card being opened.
Figure 4:
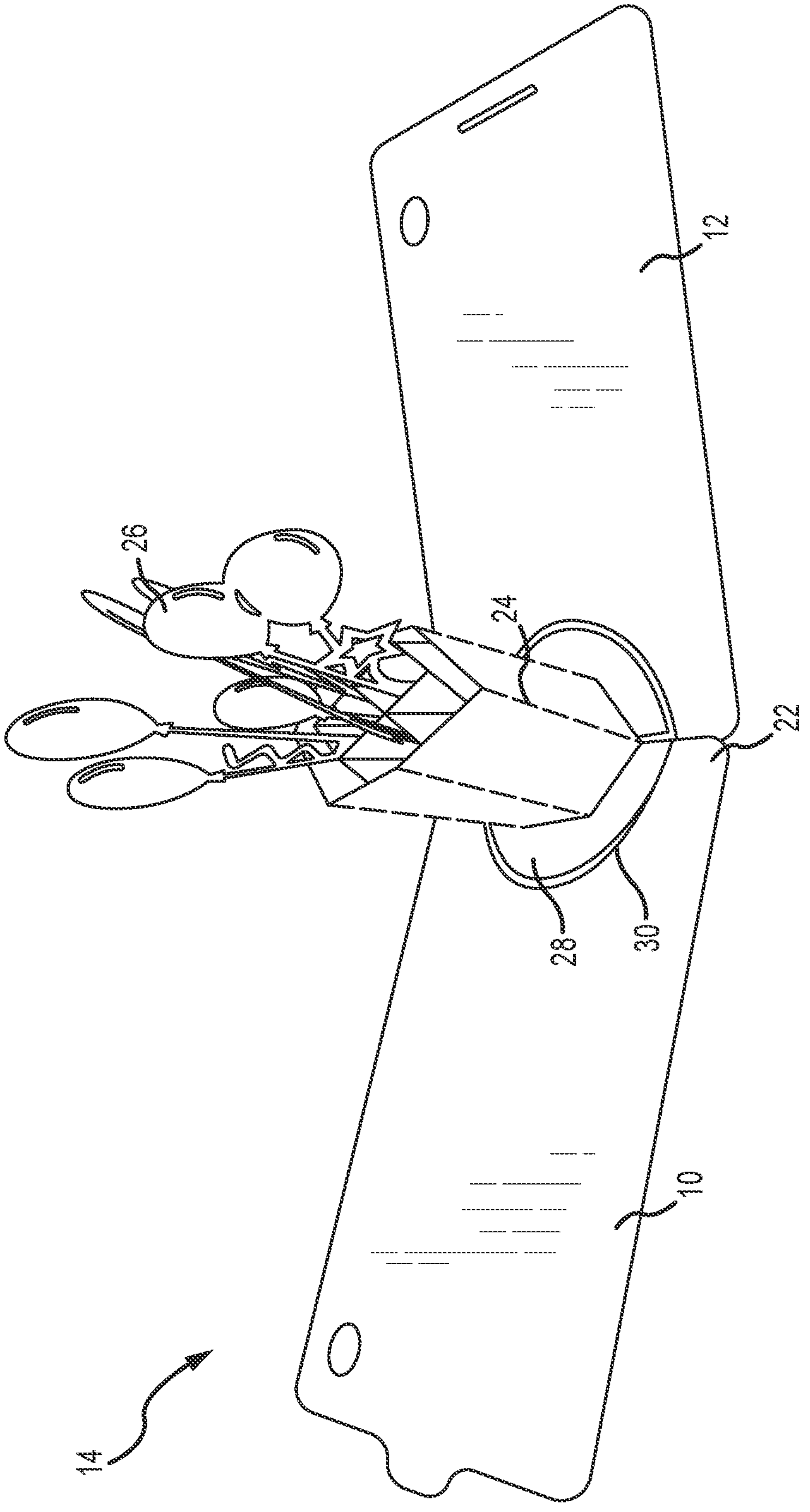

FIGS. 3 and 4 illustrate the pop-up gift card 14 being opened. As shown in FIG. 4, the pop-up card 14 comprises a card foldable along a fold line 22 between closed and opened positions and an erectable pop-up display structure 24 on the card. The pop-up display structure 24 comprises a plurality of intersecting slice-form elements 26 on a base 28. When the card 14 is closed, the pop-up display structure 24 is in a flattened state, and when the card 14 is opened, the pop-up display structure 24 is in an erected 3-D state. U.S. Pat. No. 9,524,658, which is incorporated by reference herein, illustrates various examples of pop-up cards and the construction of pop-up display structures from slice-form elements.

The card 14 includes a separable perforated section 30 extending over both sides of the fold line 22 of the card 14. The base 28 of the pop-up display structure 24 is attached to one side of the perforated section 30.

Figure 5:
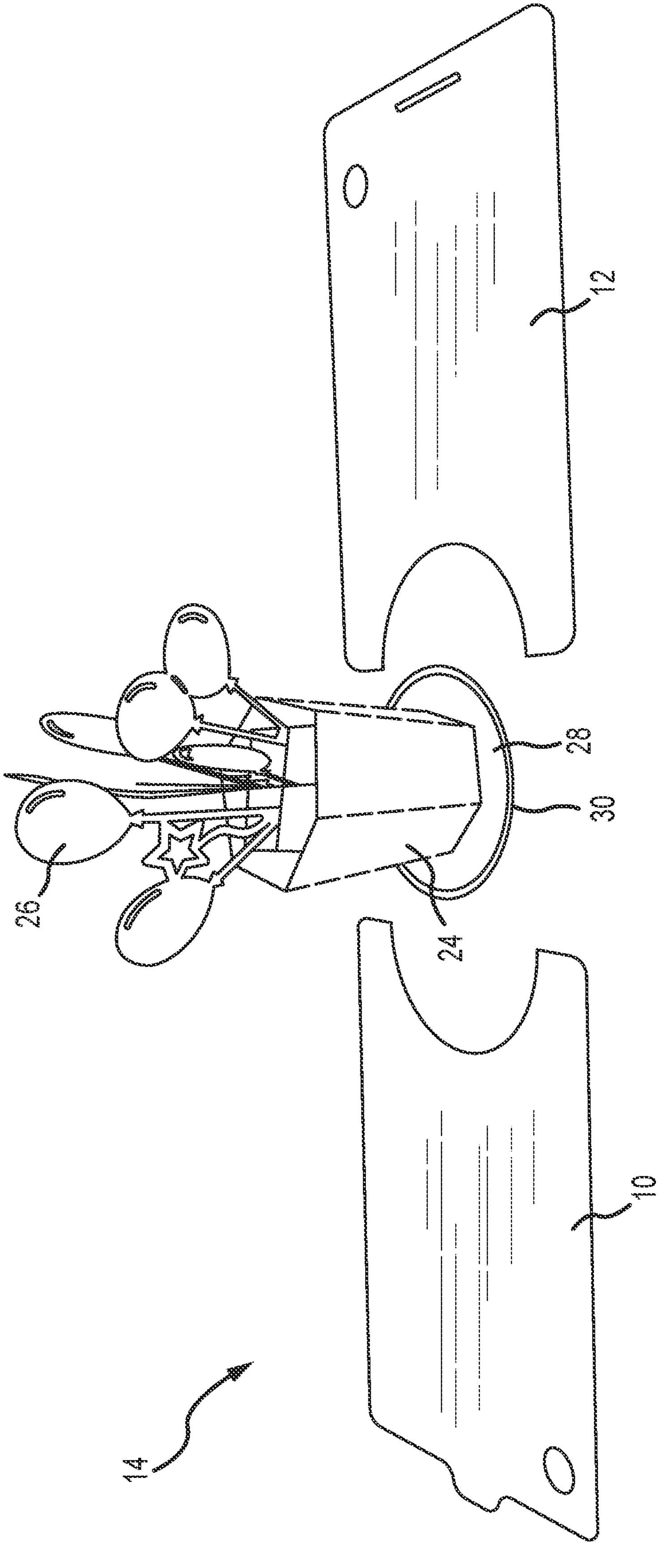
FIG. 5 illustrates separation of the pop-up display structure from the card in accordance with one or more embodiments.

As shown in FIG. 5, the pop-up display structure 24 can be removed from the card 14 by separating the perforated section 30 from the rest of the card 14 along the defining perforation.

Figure 6:
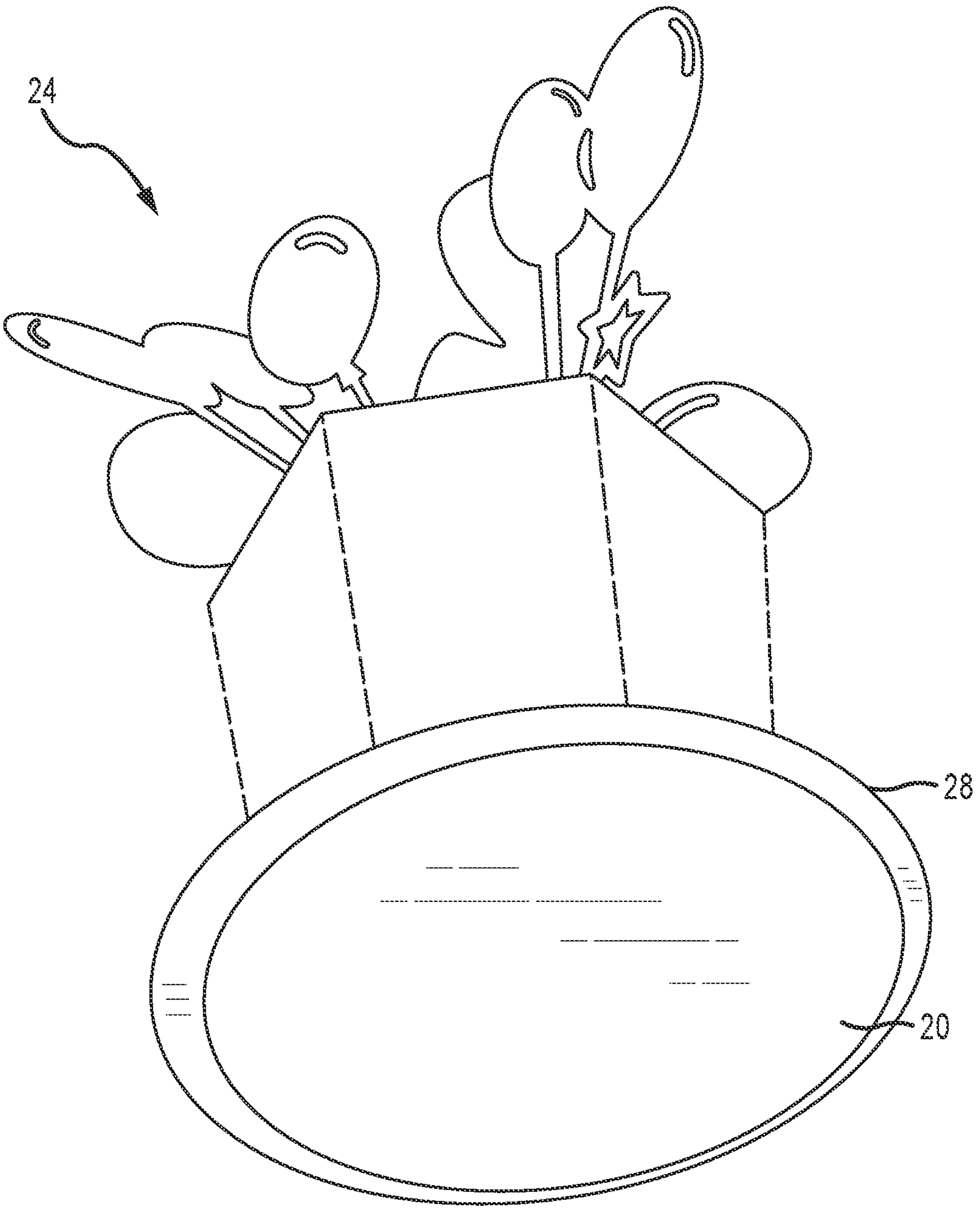
FIG. 6 illustrates affixing a support element to the pop-up display structure.

As shown in FIG. 6, the support element 20 can be removed from the card and affixed to the underside of the base 28 of the pop-up display structure 24 to maintain the pop-up display structure 24 in the 3-D state. The support element 20 can be a rigid disk made from a variety of materials including, e.g., card stock, plastic, metal, or wood. The shape of the support element 20 preferably conforms to the shape of the base 28 of the pop-up display structure 24. In this example, the support element 20 comprises a round plastic disk.

In one or more embodiments, the support element 20 is removably bonded to the outside of the card 14 with an adhesive that can be used to secure the support element 20 to the bottom of the pop-up display structure 24.

Figure 7:
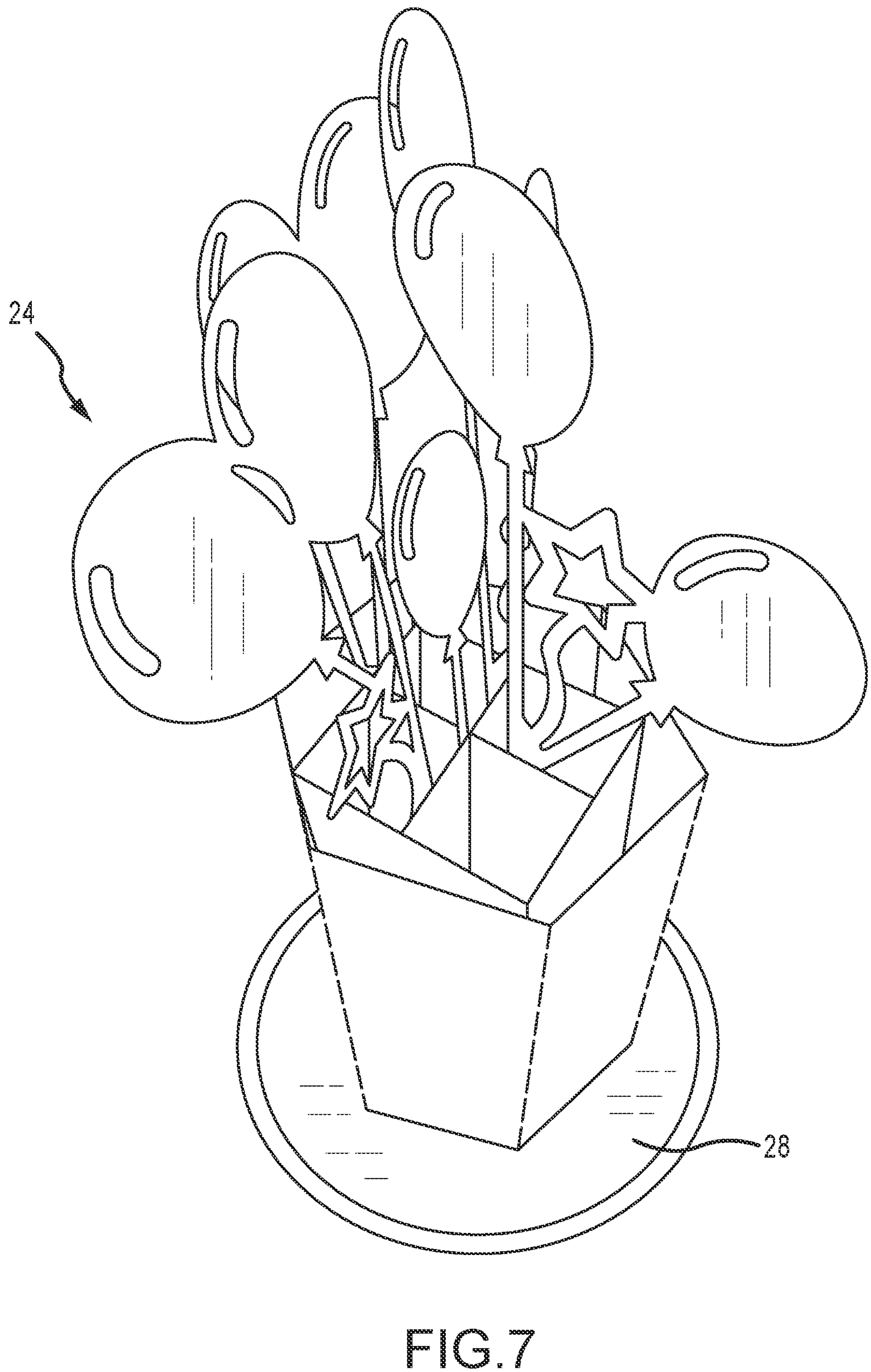
FIG. 7 illustrates the pop-up display structure with attached support element used as a display item.

Thereafter, the pop-up display structure 24 can be used as a display item as shown in FIG. 7. The support element 20 both supports the pop-up display structure 24 on a surface as well as maintains the pop-up display structure 24 in the 3-D state.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

The invention claimed is:

1. A system comprising:

a base having a top surface opposite a bottom surface;

a base fold line defined in the base, the base fold line separating a first side from a second side;

an erectable pop-up display structure connected to the top surface of the base, the erectable pop-up display structure including a display fold line aligned with and extending transverse to the base fold line, the erectable pop-up display structure foldable along the display fold line between a flattened state and an erected state, the erectable pop-up display structure moveable to the flattened state by moving the first side of the base towards the second side of the base, the erectable pop-up display structure being in the erected state when the first side of the base is coplanar with the second side of the base; and a support element connectable to the base to maintain the erectable pop-up display structure in the erected state, wherein the support element is connectable to the bottom surface of the base.

2. The system of claim 1, wherein the support element is connected to the base with removable bonding.

3. The system of claim 1, wherein the support element comprises a rigid disk.

4. The system of claim 1, wherein the erectable pop-up display structure includes a plurality of intersecting slice-form elements.

5. The system of claim 4, wherein the plurality of intersecting slice-form elements is connected to the top surface of the base at the first side and the second side.

6. The system of claim 1, wherein the bottom surface of the base is secured with an adhesive to maintain the erectable pop-up display structure in the erected state.

7. The system of claim 1, wherein the base is separable from a card at a perforated section.

8. The system of claim 7, wherein the card includes a card fold line defining a first card side and a second card side.

9. The system of claim 8, wherein the card fold line is aligned with the display fold line and the base fold line.

10. The system of claim 1, wherein the support element being connectable to the bottom surface of the base includes the support element covering at least a portion of the bottom surface of the base.

11. The system of claim 1, wherein the top surface and the bottom surface each extending to an edge, the edge extending along a curve about a center of the base.

12. The system of claim 1, wherein the support element has a support element shape, the support element shape conforming to a base shape of the base.

13. A system comprising:

a card having a card fold line defining a first card side and a second card side, the card foldable along the card fold line between a closed position and an opened position;

a base having a top surface opposite a bottom surface, wherein the base is separable from the card;

a base fold line defined in the base, the base fold line separating a first side from a second side; and an erectable pop-up display structure connected to the top surface of the base, the erectable pop-up display structure including a display fold line aligned with the base fold line and the card fold line, the erectable pop-up display structure foldable along the display fold line between a flattened state and an erected state, the erectable pop-up display structure in the flattened state when the card is in the closed position, the erectable pop-up display structure in the erected state when the card is in the opened position.

14. The system of claim 13, wherein the base is separable from the card by separating the first side of the base from the first card side and separating the second side of the base from the second card side.

15. The system of claim 13, wherein the base is separable from the card along a perforated section.

16. The system of claim 13, wherein the erectable pop-up display structure includes a plurality of intersecting slice-form elements connected to the top surface of the base at the first side and the second side.

17. A system comprising:

a base having a top surface opposite a bottom surface;

a base fold line defined in the base, the base fold line separating a first side from a second side; and an erectable pop-up display structure including a plurality of intersecting slice-form elements connected to the top surface of the base, the erectable pop-up display structure including a display fold line aligned with the base fold line, the erectable pop-up display structure foldable along the display fold line between a flattened state and an erected state, the erectable pop-up display structure moveable to the flattened state by moving the first side of the base towards the second side of the base, the erectable pop-up display structure moveable to the erected state by moving the first side of the base away from the second side of the base about the base fold line.

18. The system of claim 17, wherein the bottom surface of the base is secured with an adhesive to maintain the erectable pop-up display structure in the erected state.

19. The system of claim 17, further comprising:

a support element connectable to the base to maintain the erectable pop-up display structure in the erected state.

20. The system of claim 17, wherein the plurality of intersecting slice-form elements is connected to the top surface of the base at the first side and the second side of the base.

* * * * *